Jan. 26, 1971          J. A. RONNING          3,558,385
METHOD FOR REPAIRING DAMAGED CARPETING
Filed July 3, 1967          2 Sheets-Sheet 1
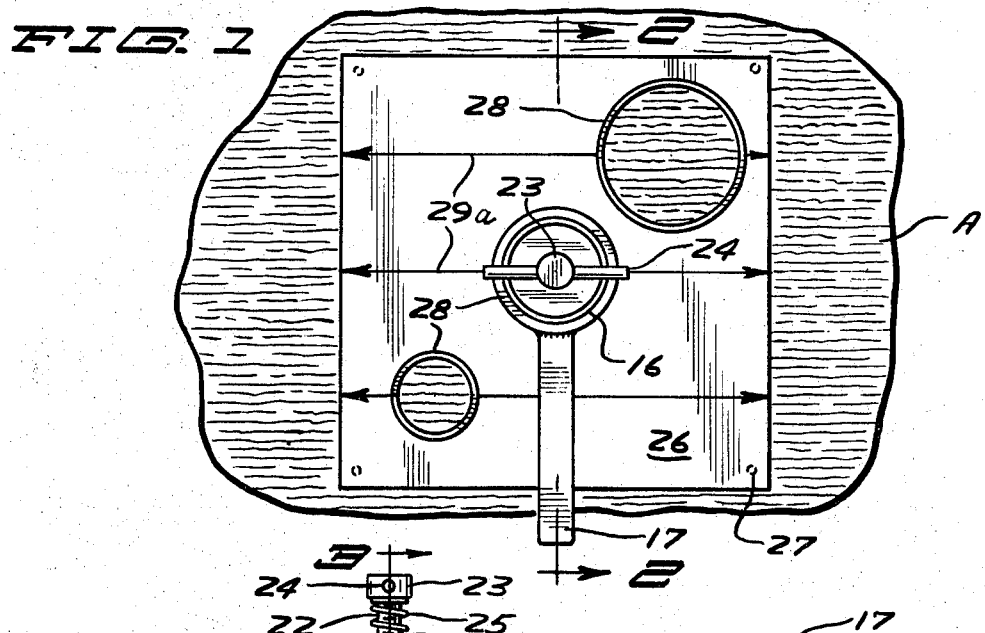
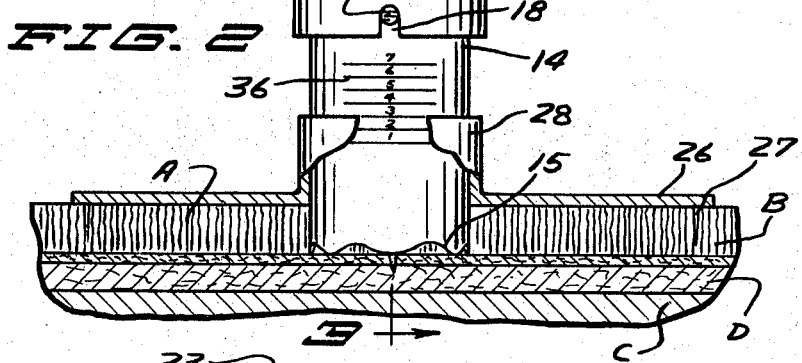
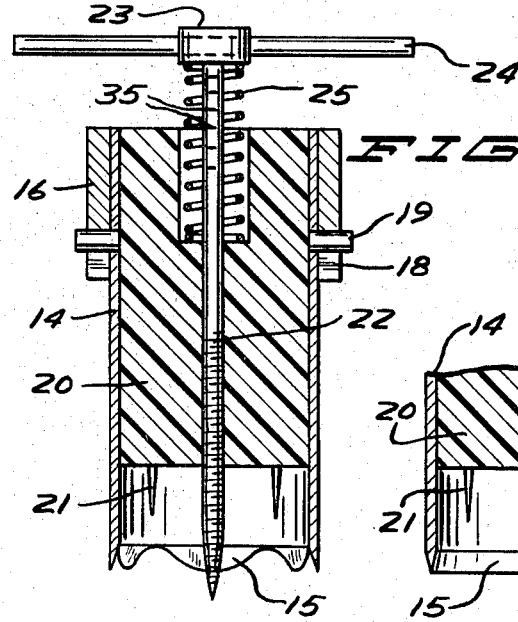
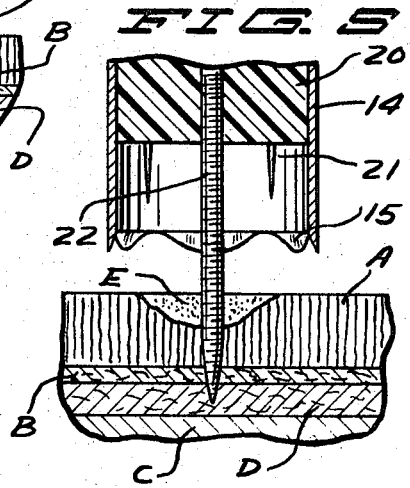
INVENTOR.
JACOB A. RONNING
ATTORNEYS

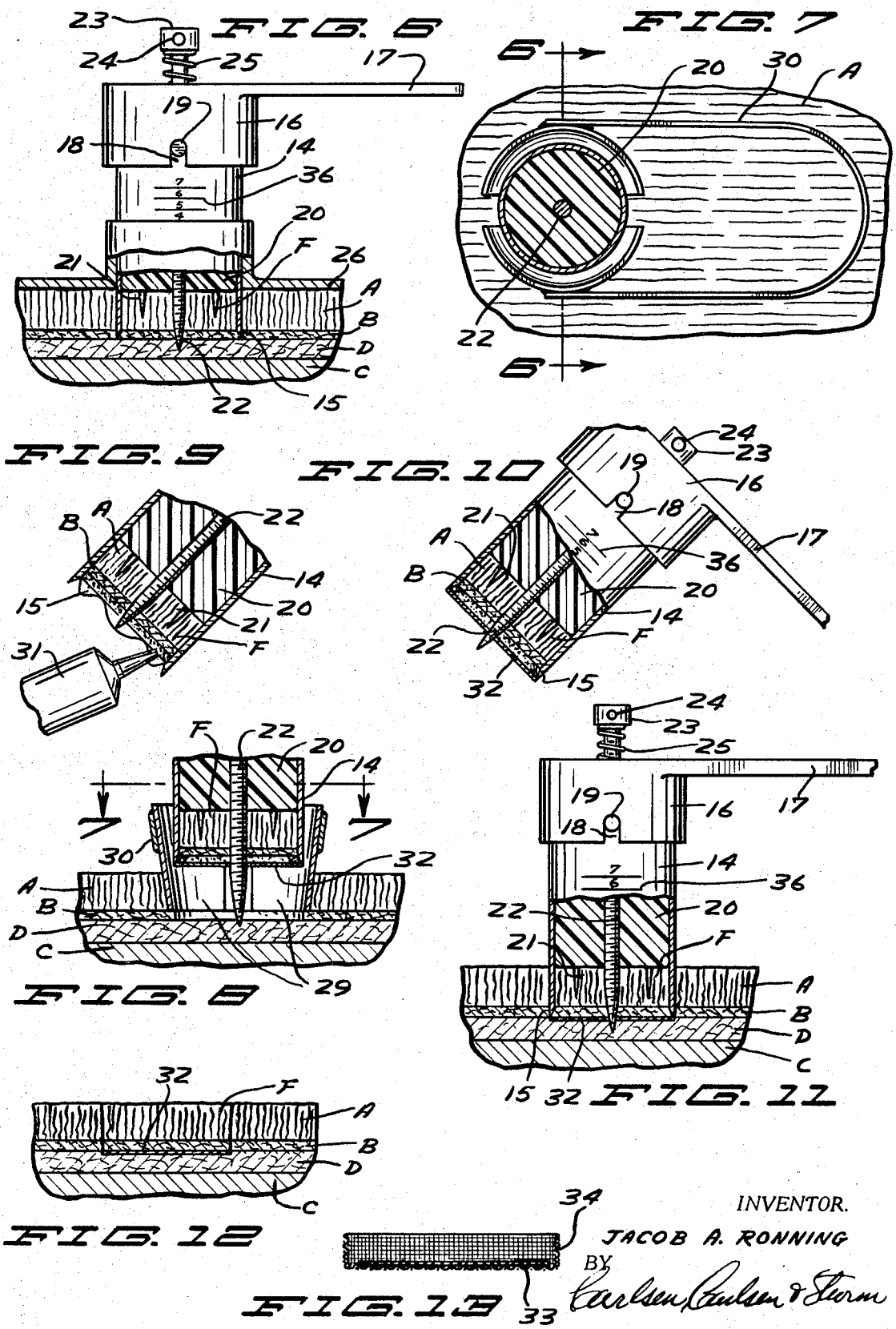

United States Patent Office 3,558,385
Patented Jan. 26, 1971

3,558,385
METHOD FOR REPAIRING DAMAGED CARPETING
Jacob A. Ronning, 3543 Irving Ave. S.,
Minneapolis, Minn. 55408
Filed July 3, 1967, Ser. No. 650,927
Int. Cl. B32b 35/00
U.S. Cl. 156—98                              4 Claims

ABSTRACT OF THE DISCLOSURE

Means and method for repairing spot damaged carpeting while it is on the floor, and in which the carpeting has a base layer supporting a layer of upstanding pile, by passing a rotating cutting tool down through both layers and about the damaged spot to remove a circular core of the carpeting, similarly cutting down through an undamaged piece of carpeting corresponding in size, diameter and color to the damaged area to form a replacement core, temporarily spreading the pile about the circular opening from which the damaged core has been removed, inserting the undamaged core downwardly into such opening while such pile is held spread and until the base layer of the core is contiguous with the edge of the surrounding carpeting base, and securing such contiguous base layer edges together with an adhesive.

---

The present invention constitutes another solution to the same problem contemplated in my copending application Ser. No. 632,629, filed Apr. 21, 1967, wherein I disclose how a damaged spot, such as a burn, in a carpet may be repaired by removing a section of pile, containing the damaged area, from the base material of the carpet and then fixedly replacing it with an undamaged but otherwise similar section of pile taken from a spare piece of carpeting or from an area of the same carpet that is less exposed to view.

While the invention of my prior application has substantial advantages over the prior art, and its merits are at least equal to those of the present disclosure in many instances, there are circumstances in which the modified subject method has been found preferable because simpler to carry out and more efficient and effective in the final results produced. This is particularly true with carpeting in which the pile does not have sufficient depth or body to permit the necessary undercutting and transposing of pile, and where a sufficiently experienced operator, with power tools and more complicated equipment, may not be available.

The present apparatus includes a cylindrical member having a circular lower end cutting edge, and has a handle at its upper end by which the operator is able to oscillate the device and simultaneously press the cutting edge down through the pile and also through the base material of the carpet to thus carve out a core containing the spot of damaged surface area which core is then discarded. The same device is then used to cut out a similar but undamaged core or section of material from a spare or concealed piece of carpeting, and this core is then secured in the aperture created by the removal of the damaged section.

To facilitate the core cutting operations a guide plate having variously sized cutter receiving apertures is placed on the carpet, and this plate is also provided with guide means operative to assist the operator in orienting the newly inserted core so that its pile row pattern will conform to that of the surrounding carpet material. Means are also provided for determining and limiting the depth of cut, so as not to reach down into the padding or floor surface, and for facilitating the application of an adhesive so as to hold the transposed core securely in place against accidental removal or displacement.

Further objects and details of construction and operation will appear in the course of the following specification and in the accompanying drawings, wherein FIG. 1 is a plan view of the core cutter and guide plate as applied to an area of carpeting being operated upon.

FIG. 2 is an enlarged elevation partly in section on line 2—2 in FIG. 1.

FIG. 3 is an enlarged detail elevation on line 3—3 in FIG. 2.

FIG. 4 is a detail section similar to the lower portion of FIG. 3, but showing a modified form of cutting edge.

FIG. 5 is a section similar to the lower end portion of FIG. 3, but showing the center guide pin of the cutter in a centering position with respect to a damaged spot in the carpeting.

FIG. 6 is a detail elevation similar to a portion of FIG. 2, but showing the lower end of the cutter in section and in an advanced core cutting position so that the inner follower block is in contact with the upper surface of the carpet section which is to be substituted for the damaged section.

FIG. 7 is a plan view of a pile spreader and holder that may be used in the repair operation, and showing it in its operative position with respect to the cutter and carpet, this view being partly in section as on line 7—7 of FIG. 8.

FIG. 8 is a sectional elevation as on line 8—8 in FIG 7.

FIG. 9 is a detail section demonstrating how an adhesive may be applied to the edge portion of the base material in the carpet section that is to replace the damaged one.

FIG. 10 illustrates how a thin disc may be applied to the base of the plug before it is inserted to ensure a proper distribution of the adhesive in the circular edge area, while also preventing undue spread of the adhesive on the pad or floor surface underneath.

FIG. 11 shows how the repair plug or section, with its protecting disc attached, may be inserted in its final position.

FIG. 12 is a vertical section through the repaired portion of the carpet, with all equipment removed.

FIG. 13 is an enlarged perspective view, in diametrical section, of a modified form of adhesive retention disc that may be used to advantage in securing the repair plug.

Referring to the drawings more particularly and by reference characters, A designates the pile of a carpet or rug having the customary woven base element B resting in normal manner on a floor C or upon a pad D between the floor and carpet. E represents a spot or section that has been damaged by a burn or other cause and is to be repaired by being removed and replaced by an unspoiled section or plug F.

The cutting device for removing the damaged section E and for removing, transposing and inserting the undamaged plug F, consists primarily of a tubular sleeve 14 having a sharp circular cutting edge 15 at its lower end. This edge may be plain and of double taper, as shown in FIG. 4, but is preferably serrated and with only inward bevel, as indicated in FIGS. 2, 3, 5 and 9.

Removably fitted on the upper end of the sleeve 14 is the collar 16 of an operating handle 17, the collar having slots 18 fitting over pins 19 to ensure downward movement and oscillation of the cutter sleeve with the handle. Within the sleeve 14 is slidably and rotatably mounted a block 20 from the lower end of which project pins 21 adapted to penetrate downwardly into the pile portion of the carpet section being removed.

Coaxially mounted in the block 20, for vertical and rotational movement therein, is a guide rod or screw 22 which is tapered and threaded at its lower end, while its upper end has a collar 23 supporting a cross bar 24 serving as a handle by which the screw is manipulated. The bar 24 is preferably slidable in the collar so that it can be removed to permit detachment and removal of the handle unit 16–17. A spring 25 surrounds the upper part of the screw 22 and is under compression to exert a lifting pressure on the screw.

Although the cutting device, as above set forth, may be used effectively as it is, particularly by an experienced operator, it is preferable to employ a guide plate 26 which, in the present instance, comprises a rectangular metal element for placing over the carpet area to be operated on, and which is preferably maintained in position by a series of pile penetrating points 27. The plate is then provided with a series of collars 28 defining apertures of differing diameters to accommodate various sizes of cutter sleeves 14, it being understood that an operating kit will contain a suitable variation of cutter sizes so that only a damaged area of minimum size need be removed. The plate is also provided with one or more lines or arrows 29a which are placed in parallelism with the pile rows so as to constitute a visible indexing medium, to be oriented with the handle 24, as shown in FIG. 1, to thus assist the operator in properly inserting the new section of carpeting.

To further assist in most effectively carrying out the repair operation I provide the device shown in FIGS. 7 and 8, and which includes a pair of arcuate guides 29 carried by a flexible spring 30 serving as a manipulating handle. These guides 29 are trunco-conical sections that taper downwardly and are normally spaced apart but may be brought together by merely squeezing the spring 30 which is disposed in a horizontal position immediately above the carpet. The function of the guides is to maintain the pile around the space created by removing the core in a condition where it will not interfere with the insertion of the new plug. When the core has been cut out with the aid of the guide plate 26 then, and after the plate has been removed, the device 29–30 is merely inserted, slightly manipulated and then left in place until the new core has been inserted. If the plate 26 is not used then the cutter sleeve 14 is operated to the desired depth and the guide members may then be pushed down around the sleeve and left in place until the entire replacement operation is completed.

To ensure permanent retention of the new plug in the aperture from which the damaged section has been removed, it is necessary to secure the peripheral edge of the base part of the plug to the surrounding edge of the carpet base into which the plug base is fitted. This is done by a suitable glue or other adhesive, and it is of considerable importance that this be carefully done because while there is no serious objection if some of the adhesive gets up into the lower part of the pile material, it is objectionable if a substantial amounts gets into contact with the floor or pad. In short it is preferable to bond the plug to the carpet, of which it is to become a part, rather than to the surface which supports the carpet.

To this end I first apply the adhesive to the under side of the plug base, and around the entire circumference thereof, while the new plug is still contained within the lower end of the cutter sleeve. This may be done from a supply tube 31 as illustrated in FIG. 9. I then apply a paper or card disc 32 to the ring of glue, as shown in FIG. 10, and this disc is preferably of a diameter that will completely fill in the full lower end space at the tip edge of the beveled cutter edge. The entire assembly is then pressed down into its final position as indicated in FIGS. 11 and 12, and the block 20 is firmly held down against the plug, while the sleeve 14 is being withdrawn, thus leaving the glue to set between the adjoining base edges above the disc 31 which now further serves to keep the glue from spreading downwardly.

Another way of applying and containing the adhesive is to employ a device such as shown in FIG. 13, which consists of an imperforate disc 33 from which extends a screen flange 34 of such size as to snugly fit around the base material B of the plug that is to be inserted in the carpet. In this instance the adhesive is applied to the top or inner surface of the disc 33 immediately before the device is applied to the plug. When the plug is then pressed down into place the adhesive is spread radially outwardly into the area where the edges of the base elements come into contact with each other. The wire flange 34 is of fine mesh and is, of course, permanently retained in place with the disc 33.

When the present invention is employed in repairing a damaged carpet the operator first selects a cutter 14 of such size that it will completely embrace the area that must necessarily be removed. If he uses the guide plate 26 he puts it in place with the proper sized collar 28 surrounding that area, and with the guide lines 29a disposed parallel with the rows of pile. If the plate is not used then the screw 22 will be centered as close as possible to the center of the spot E and will thereby properly locate the cutter sleeve 14. In either event the screw is turned down through the pile A and into the base material B so that it will be anchored therein, which can easily be determined with a little experience, but the turning should be discontinued when the handle 24 is also parallel with the pile rows, as shown in FIG. 1. As the base material in most carpeting is approximately one-eighth inch in thickness, the guide screw 22 may have one-eighth inch graduation marks 35 to aid the operator in this regard.

With the collar 16 in place on the pins 19 the handle 17 is oscillated while downward pressure is also applied to perform the cutting action. If the thickness of the carpet is known then a scale 36 can be read to determine the necessary depth of cut. If it is not known then the operator merely cuts down through the relatively softer pile until he feels contact of the cutter with the base material B and then consults the scale 36, if necessary, to determine the remaining one-eighth inch depth of cut. With the full cut completed the cutter is raised from the floor and the severed plug is removed from its lower end and discarded.

In the event that the plate 26 has not been used then the guide members 29 are placed against the sides of the cutter sleeve 14 and are pushed down against the base material B where they are kept during the plug removal, and are left there until the new plug has been inserted to thus keep the pile from spreading into the opening that has been created. If the plate 26 has not been used the members 29 are manipulated down into the opening and are permitted to expand against the pile under the slight tension of the spring handle 30, and the device is then likewise permitted to remain until the new plug has been inserted.

The new plug which is to be inserted is cut from a fresh or undamaged piece of carpeting in substantially the same manner as above described for removing the damaged section. In this case, however, the operator takes particular care to make certain that the screw handle 24 is parallel with the pile rows before the plug is lifted from the original location, so that its pile rows may be properly aligned with those of the new location.

He now also must make certain that the glue or other adhesive is properly applied to the base of the plug in conjunction with a disc, such as 32 or 33, in a manner such as above set forth, whereupon the undamaged plug is set in place, the guides 29 are removed, the screw 22 is unscrewed, and the sleeve 14 is removed while the block 20 is being held down against the plug. All of the apparatus is then removed, the operator may step on the area as a final gesture, and the operation is completed. When the adhesive has set it will securely hold the new plug in place and it becomes virtually impossible to detect where the carpet had been damaged and repaired.

Having disclosed and described my invention, what I claim to be new and desire to protect by Letters Patent is:

1. The method of repairing spot damaged carpeting while in its laid position on the floor and in which the carpeting has a layer of base material supporting an upper layer of pile, which includes the steps of (a) circularly cutting down through both layers and around the damaged area to produce a severed core section of the carpeting, (b) removing said damaged core section, (c) circularly cutting down through an undamaged piece of like carpeting to form a core section corresponding in size, diameter and color to the damaged core section, (d) temporarily spreading the pile about the circular opening from which the damaged core section has been removed, (e) inserting the undamaged core section downwardly into such opening while such pile is being held spread and until the base layer thereof is flush with the surrounding base layer of carpeting, and (f) binding the contiguous edges of said base layers together by application of an adhesive.

2. The method set forth in claim 1 in which the adhesive is applied to the pile portion of the undamaged core section before it is inserted in the opening.

3. The method set forth in claim 1 which includes the further step of (g) applying an element to the underside of the transposed section that will serve to contain the adhesive between said contiguous edges of base material until it has set.

4. The method set forth in claim 1 which includes the further steps of (g) securing an anchor member in the undamaged core section before it is cut, and (h) removing it only after such core section has been transposed to its second position.

References Cited
UNITED STATES PATENTS

| | | | |
|---|---|---|---|
| 1,942,425 | 1/1934 | Holman | 156—94 |
| 1,947,152 | 2/1934 | Clark | 156—98UX |
| 2,245,202 | 6/1941 | Krasno | 161—Patch Digest |
| 3,271,217 | 9/1966 | Mapson | 156—98 |

BENJAMIN A. BORCHELT, Primary Examiner

S. C. BENTLEY, Assistant Examiner